United States Patent [19]

Leveskis et al.

[11] 3,867,461

[45] Feb. 18, 1975

[54] NON-HAZARDOUS KETONE PEROXIDE COMPOSITIONS

[75] Inventors: Newton G. Leveskis, Walnut Creek; Charles B. Abma, Oakland, both of Calif.

[73] Assignee: Argus Chemical Corp., Brooklyn, N.Y.

[22] Filed: Dec. 8, 1971

[21] Appl. No.: 206,173

Related U.S. Application Data

[62] Division of Ser. No. 702,783, Feb. 5, 1968, Pat. No. 3,702,869.

[52] U.S. Cl. .............................. 260/610 A, 252/186
[51] Int. Cl. ............................................. C07c 73/00
[58] Field of Search ................ 260/610 SK, 610 A; 252/186

[56] References Cited
UNITED STATES PATENTS 3,702,869  11/1972  Leveskis et al. ............... 260/610 A

FOREIGN PATENTS OR APPLICATIONS 1,072,728  6/1967  Great Britain ................ 260/610 A
1,050,841  12/1966  Great Britain ............... 260/610 SC

*Primary Examiner*—Bernard Helfin
*Assistant Examiner*—W. B. Lone
*Attorney, Agent, or Firm*—Townsend and Townsend

[57] ABSTRACT

Hazards from exposure to heat and reduction in effectiveness during storage of lower alkyl ketone peroxides such as methyl ethyl ketone peroxide are ameliorated through the combination of a heat desensitizing solvent having a boiling point between about 185°–225° C, for example an ester such as ethyl benzoate, and a stabilizer selected from vinyl pyrrolidone and polyvinyl pyrrolidone.

5 Claims, No Drawings

NON-HAZARDOUS KETONE PEROXIDE COMPOSITIONS

This is a division, of application Ser. No. 702,783, filed Feb. 5, 1968, now U.S. Pat. No. 3,702,869.

This invention relates to storage stable and heat desensitized alkyl ketone peroxides. More particularly, it relates to lower alkyl ketone peroxides in combination with certain miscible solvents and pyrrolidone stabilizers for rendering the ketone peroxides storage stable and heat desensitized.

In the preferred embodiment the invention provides a lower alkyl ketone peroxide composition containing a solvent that is miscible with the organic peroxide and which has a boiling point about 185°–225° C. The solvent falls categories: one of the following categories; esters, aldehydes, ketones, hydrocarbons, halogenated hydrocarbons, and epoxides. Use of a sufficient amount of any member of this group having the requisite boiling point has been found to significantly reduce the capacity of the ketone peroxide to violently decompose upon exposure to heat.

In addition to the heat desensitizing solvent, a storage stabilizer selected from vinyl pyrrolidone and polyvinyl pyrrolidone may be included. When added in an effective amount, it has been found that decomposition of the ketone peroxide of the type that liberates gaseous by-products or decreases effectiveness of the peroxide in terms of lengthened gel times of monomers initiated therewith is substantially eliminated. Either the heat desensitizing solvent or the stabilizer can be used along with the advantages contributed by each being obtained, or they may be used together to concurrently obtain the advantages of the two additives.

The prior art discloses the advantages of incorporating certain solvents with alkyl ketone peroxides. The prior solvents suggested have generally been limited to monohydric alcohols and related polyol materials. The present invention is based upon the discovery of a wide group of materials of differing chemical structure, i.e., they are not alcohols and glycols as noted above, which can be used to obtain equal and superior results to the hydroxy type solvents previously used.

Similarly, it has been previously reported that certain pyrrolidone additives were advantageously added to ketone peroxides to stabilize them during periods of storage. The present invention is based upon the discovery that vinyl pyrrolidone and polyvinyl pyrrolidone, which have not heretofore been used as ketone peroxide stabilizers, are significantly superior as stabilizers compared with the pyrrolidones which have been used in the past.

The solvent and stabilizer materials of this invention are advantageously used with organic ketone peroxides, preferably those alkyl ketone peroxides having relatively low molecular weights. Included within this category are acetone peroxide, methyl ethyl ketone peroxide, diethyl ketone peroxide, methyl propyl ketone peroxide, methyl isobutyl ketone peroxide, as well as the lower molecular weight alicyclics such as cyclopentanone peroxide, cyclohexanone peroxide, 3-methyl cyclopentene-2-one peroxide. In most cases, the lower alkyl ketone peroxides, both acyclic and cyclic, of this invention contain up to about 6 carbon atoms, the cycloalkyls optionally additionally containing aliphatic or aromatic substituents on the rings. A preferred lower alkyl ketone peroxide for use in the present invention is formed as a coreaction product of methyl ethyl ketone, 2,4-pentanedione, and hydrogen peroxide. This ketone peroxide composition is more fully described and claimed in co-pending application, Ser. No. 473,855 filed July 21, 1965, now abandoned.

The amount of heat desensitizing solvent incorporated may vary to some extent depending on the particular ketone peroxide composition, its active oxygen content and the amounts of other optional elements such as plasticizers and other solvents which may be present. In general, for commonly encountered ketone peroxides of commerical significance the heat desensitizing solvent will constitute at least about 3% by weight of the composition, and preferably about 5–25% by weight of the composition. There is substantially no upper limit to the amount of heat desensitizing solvent which could be used if desired, ranging up to 90% and more of the composition.

Recently, a test known as a pressure vessel test (PVT) has been suggested in the organic peroxide industry in an attempt to standardize what is meant by heat sensitivity of an organic peroxide. This test assesses the rate and amount of energy generated in a peroxide decomposition and is measured by the size of an aperture needed to vent the decomposition vapors and prevent the rupture of a standard pressure disc upon rapid heating. There is some agreement in the industry to the proposition that with the use of a standard vessel and a standard rate of heating of peroxide in the vessel, the maximum aperture size that should be tolerated in order to classify an organic ketone peroxide as safe with respect to the application of heat thereto, is a 10 millimeter diameter aperture. It is likely that the preferred practice of the present invention will be to select a heat desensitizing solvent in an amount sufficient to permit the use of a 10 millimeter or smaller diameter opening in the rupture discs used in the performance of the PVT. Use of a solvent belonging to one of the noted groups and having the requisite boiling point in an amount of about 5–25% by weight will in general achieve this goal.

In the case of the storage stabilizing vinyl pyrrolidone or polyvinyl pyrrolidone, the amount used for commercial purposes will generally constitute at least about 0.5% by weight of the composition. Optimum results have so far been observed with the stabilizer added to constitute about 2% by weight of the formulation. The vinyl pyrrolidone and polyvinyl pyrrolidone of this invention are particularly effective in substantially eliminating decomposition of the ketone peroxides of the type that liberates gaseous by-products. In this regard, packaging of ketone peroxide is frequently accomplished in plastic containers such as polyethylene bottles. In the absence of the present stabilizers, during a period of normal storage gaseous by-product is generated causing the container to bulge and distort to a considerable extent. By contrast storage of ketone peroxide compositions with the present stabilizers have been shown to result in no gassing or distortion of the container. In addition, ketone peroxides which included previously used stabilizers upon use after storage have been shown to require lengthened time for causing gelling of monomers. In the experimental work to be described hereinafter it will be demonstrated that the present stabilizers succeed in retaining substantially the same short length of time needed to gel a monomer after periods of storage as initially required when in a freshly synthesized condition.

In addition to ketone peroxide, heat desensitizing solvent, and storage stabilizer, any of the other usual components used in ketone peroxide compositions may optionally be included. For example, plasticizers such as the phthalate ester like dimethyl phthalate, dibutyl phthalate and the like may be incorporated. Another common component in such compositions is water. Where flame resistance is desired, a suitable amount of water may be included in accordance with the teachings of copending patent application, Ser. No. 584,608 filed Oct. 5, 1966, now U.S. Pat. No. 3,507,800. Emulsifying agents such as detergents is another type of ingredient which may optionally be included where a homogenous non-separating composition in a paste or fluid form is desired. The amounts and types of these optional additives are well-known in the art and the present invention is in all ways consistent with this prior body of knowledge.

The amount of ketone peroxides in the composition is open to wide variation. As a practical matter, most commercial compositions will contain sufficient ketone peroxide to provide an active oxygen content in the final product of about 9.0–12.5%.

Any solvent having a boiling point between about 185°C and 225°C that is miscible with the ketone peroxide will achieve the desired heat desensitization of the organic peroxide. It will also permit preparation of a formulation which tolerates a rupture disc with an opening of 10 millimeters or less in the PVT. These solvents are esters, aldehydes, ketones, hydrocarbons, halogenated hydrocarbons or epoxides. Typical examples of suitable solvents within these categories are as follows:

| ESTERS | Boiling Point, C. |
|---|---|
| Benzyl acetate | 213.5 |
| Benzyl propionate | 220.2 |
| Butyl caproate | 207.7 |
| Ethylene glycol dipropionate | 211.2 |
| Heptyl propionate | 210.0 |
| Methyl benzoate | 199.5 |
| Methyl phenyl acetate | 220.0 |
| Octyl acetate | 210.0 |
| 2-Ethyl hexyl acetate | 199.0 |
| Isopropyl benzoate | 218.5 |
| Propyl caprylate | 226.4 |
| Triethyl phosphate | 215.0–216.0 |
| Ethyl benzoate | 214.0 |
| Ethyl octoate | 208.5 |
| Methyl decanoate | 223.0–224.0 |

| ALDEHYDES | Boiling Point, °C. | EPOXIDES | Boiling Point, °C. |
|---|---|---|---|
| n-Chlorobenzaldehyde | 213.0–214.0 | Styrene oxide | 191.0–192.0 |
| Decanal | 210.0 | | |

| KETONES | Boiling Point, °C. |
|---|---|
| Acetophenone | 201.7 |
| Isophorone | 215.3 |
| Isobutyl ketone | 218.2 |
| Methyl phenyl di-ketone | 216.8 |
| Diamyl ketone | 228.0 |
| Diisoamyl ketone | 226.0 |
| Ethyl octyl ketone | 227.0 |
| Ethyl phenyl ketone | 218.0 |
| Methyl benzyl ketone | 210.0–212.0 |

| HYDROCARBONS | Boiling Point, °C. |
|---|---|
| Amyl benzene | 205.3 |
| Iso amyl benzene | 198.0–199.0 |
| Decalin | 193.3 |
| o-Diisopropyl benzene | 210.0 |
| n-Diisopropyl benzene | 202.0 |
| n-Dodecane | 214.5 |
| 2,4, 5,7-tetramethyl octane | 208.0–210.0 |
| n-amyl toluene | 199.5 |
| 1,2, 3,4 tetramethyl benzene | 205.0 |
| 3,5 diethyl toluene | 198.0–200.0 |
| Hexahydronaphthalene | 207.0–208.0 |

| HALOGENATED HYDROCARBONS | Boiling Point, °C. |
|---|---|
| Phenyl trichloride | 200.7 |
| 3-bromo-o-xylene | 213.0–214.0 |
| 4-bromo-o-xylene | 214.0–215.0 |
| 2-bromo-m-xylene | 206.0 |
| 4-bromo-m-xylene | 205.0—207.0 |
| 5-bromo-m-xylene | 204.0 |
| o-dibromobenzene | 221.0–222.0 |
| p-dibromobenzene | 220.3 |
| 1,4-dibromobutane | 197.0–198.0 |
| 1,1-dibromo-2,2-dichloro ethane | 195.0–200.0 |
| Bromo octane | 201.5 |
| Tetra bromo ethylene | 226.7 |
| 1,2,3-trichloro benzene | 213.0 |
| 1,2,4-trichloro benzene | 215.0–216.0 |

To illustrate the effectiveness of such solvents, a series of ketone peroxide compositions were prepared with various solvents as shown in the table below. The methyl ethyl ketone peroxide composition was a standard commercial type of formulation including about 60% methyl ethyl ketone peroxide and 40% dimethyl phthalate. To a series of samples, a portion of the following solvents was added thereto to constitute 10% by weight of the formulation. All of the samples were tested in PVT apparatus. The size of the disc opening required to avoid rupture during the test is indicated in the table below:

TABLE I

Methyl Ethyl Ketone Peroxide

| Solvent Added | Boiling Point°C | PVT Disc Size(mm.) |
|---|---|---|
| None (Control) | 280.0* | 24.0 |
| Methyl Benzoate | 199.5 | 9.0 |
| Ethyl Benzoate | 214.0 | 5.5 |
| Isopropyl Benzoate | 219.0 | 5.5 |
| Propyl Benzoate | 230.0 | 16.0 |
| Butyl Benzoate | 249.0 | 24.0 |
| Amyl Acetates | 150.0 | 16.0 |
| Ethylene Glycol Diacetate | 190.9 | 11.0 |
| Butyl Benzene | 183.3 | 5.0 |
| 1-Chloro Octane | 183 | 10.0 |
| Acetophenone | 202 | 6.0 |
| Ethyl Octanoate | 208 | 3 |
| Octyl Acetate | 210 | 4 |
| Methyl Caproate | 223 | 3 |
| Methyl Octanoate | 193 | 3 |
| Diethyl Succinate | 218 | 4 |
| Styrene Oxide | 191.0 | 6.0 |

*Boiling point of dimethyl phthalate

In the following cases, heat desensitizing solvents were added to different ketone peroxides as indicated with the PVT results as shown:

Coreaction product of 2,4-pentanedione, methyl ethyl ketone, and aqueous hydrogen peroxide*

| Heat Desensitizing Solvent | Amount % | PVT |
|---|---|---|
| None | | 24 |
| Ethyl Benzoate | 10 | 9 |

90% Bis-(1-Hydroxy Cyclohexyl) Peroxide + 10% dimethyl phthalate

| Heat Desensitizing Solvent | Amount % | PVT |
|---|---|---|
| None | | 11 |
| Ethyl Octanoate (replacement for the dimethyl phthalate) | 10 | 5 |

Ethyl Amyl Ketone Peroxide**

| Heat Desensitizing Solvent | Amount % | PVT |
|---|---|---|
| None | | 5 |
| Ethyl Octanoate | 10 | 1 |

*Preparation in accordance with patent application Ser. No. 473,855 filed July 21, 1965.
**Preparation in accordance with U.S. Pat. No. 3,151,170.

Comment:

The above results show the advantages of the addition of heat desensitizing solvents provided by this invention. Attention is called to the results with those solvents falling outside of the critical boiling point range of this invention (185°–225° C), in which cases the PVT values were in the relatively less safe range of substantially greater than 10 approaching the control methyl ethyl ketone peroxide composition which has a PVT value of 24 in the absence of any desensitizing solvent. For example butyl benzoate is an ester miscible with the methyl ethyl ketone peroxide composition but its boiling point is 249° C, considerably above the upper limit of 225° C of this invention and its PVT value was the same as the control peroxide composition.

The following results illustrate the effect of variation in concentration of the heat desensitizing solvents of this invention. A typical methyl ethyl ketone peroxide formula* was again selected to which varying concentrations of ethyl benzoate and ethyl octanoate was added. The effect on PVT results is as follows:

TABLE II

| Solvent | Amount Weight % | PVT Disc Size |
|---|---|---|
| None | | 24 |
| Ethyl Benzoate | 1 | 20 |
| do. | 2 | 14 |
| do. | 3 | 12 |
| do. | 4 | 6 |
| do. | 5 | 6 |
| do. | 7.5 | 5 |
| do. | 10 | 6 |
| Ethyl Octanoate | 1 | 22 |
| do. | 2 | 20 |
| do. | 3 | 5 |
| do. | 4 | 4 |
| do. | 5 | 4 |
| do. | 7.5 | 4 |
| do. | 10 | 3 |

*Approximately 60% methyl ethyl ketone peroxide and 40% dimethyl phthalate.

Comment:

From the above it can be seen that a minimum of about 3% by weight of heat desensitizing solvent is needed where a PVT value of about 10 or less millimeters in disc opening diameter is desired.

Concentration on the order of 5–10% and up to about 25% by weight of heat desensitizing solvent will generally provide optimum results in terms of heat desensitization and avoidance of overdilution and reduction of the active oxygen content of the formulation.

To illustrate the advantages of the present vinyl pyrrolidone and polyvinyl pyrrolidone stabilizers during storage the following experimental work is offered: Two organic ketone peroxide compositions were made up with the following materials:

Composition A:
12-Parts Methyl Ethyl Ketone
3-Parts 2,4-Pentanedione
15-Parts 50% Hydrogen Peroxide
15-Parts Hexylene Glycol
4.5 Parts H + Ion Exchange Resin Composition B:
12-Parts Methyl Ethyl Ketone
3-Parts 2,4-Pentanedione
15-Parts 50% Hydrogen Peroxide
15-Parts Methyl Carbitol
4.5 Parts H + Ion Exchange Resin The materials were allowed to react overnight (17 hours) after which the reaction product was filtered and adjusted to a pH of 5 with pyridine.

To 6 pounds of each product, 50 grams of stabilizer was added. The stabilized formulations were maintained at room temperature for a period of 13½ months. The pH, and time to gel of a typical polyester monomer were compared at the start and end of the test. Results are as follows:

| Formulation & Stabilizer | pH Start | pH End | Gel Time Start | Gel Time End |
|---|---|---|---|---|
| A. N-methyl-2-pyrrolidone | 5 | 3.5 | 21 min. | 25 min. |
| B. N-methyl-2-pyrrolidone | 5 | 4 | 18 min. | 23 min. |
| A. Polyvinyl Pyrrolidone* | 5 | 4.5 | 21 min. | 21 min. |
| B. Polyvinyl Pyrrolidone* | 5 | 4.5 | 18 min. | 20 min. |
| A. Vinyl Pyrrolidone | 5 | 4.5 | 21 min. | 21 min. |
| B. Vinyl Pyrrolidone | 5 | 4.5 | 18 min. | 20 min. |

*Viscosity grade K-15 average molecular weight 10,000. Equivalent results are obtained with other viscosity grades.

In another test with formulations A and B as above and stabilized with pyrrolidones, the formulations were subjected to heat at a temperature of 135° F for a 2-week period. The formulations were placed in separate 1-gallon polyethylene bottles with self-sealing caps prior to the test. pH at the start and termination of the 2-week period as well as gelling times for a typical polyester monomer are shown in the table below:

| Formulation & Stabilizer | pH Start | pH End | Gel Time Start | Gel Time End |
|---|---|---|---|---|
| A. No additives | 5 | Less than 3 | 21 min. | 44 min. |
| B. No additives | 5 | Less than 3 | 18 min. | 62 min. |
| A. N-methyl-2-pyrrolidone | 5 | 3.5 | 21 min. | 29 min. |
| B. N-methyl-2-pyrrolidone | 5 | Less than 3 | 18 min. | 30 min. |
| A. Polyvinyl Pyrrolidone | 5 | 4.5 | 21 min. | 24 min. |
| B. Polyvinyl Pyrrolidone | 5 | 4 | 18 min. | 21 min. |
| A. Vinyl Pyrrolidone | 5 | 4.5 | 21 min. | 24 min. |
| B. Vinyl Pyrrolidone | 5 | 4 | 18 min. | 20 min |

Again the stabilizer was added to constitute 2% by weight of the formulation.

Comment:

At the end of the 2-week period of the test, the bottles containing N-methyl-2-pyrrolidone were bulged out at the top and bottom of the bottle. The bottles were distorted and no longer depressible by hand pressure. In the case of the bottles containing vinyl pyrrolidone and polyvinyl pyrrolidone stabilizers, there was no bulging or distortion of the polyethylene bottles and the bottles were depressible easily by hand pressure.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A storage stable ketone peroxide composition formed from at least one alkyl or cycloalkyl ketone having up to eight carbon atoms, said ketone peroxide composition containing at least about 0.5% by weight of stabilizer selected from the group consisting of vinyl pyrrolidone and polyvinyl pyrrolidone to substantially inhibit decomposition of said ketone peroxide of the type that liberates gaseous by-products or decreases effectiveness in terms of lengthened gel time of monomers initiated therewith and said ketone peroxide is present in the composition in an amount sufficient to provide up to about 12.5 percent active oxygen content to said composition.

2. A storage stable lower alkyl ketone peroxide composition in accordance with claim 1 wherein said ketone peroxide is present in the composition in an amount sufficient to provide about 9.0 to 12.5 percent active oxygen content to said composition.

3. A storage stable lower alkyl ketone peroxide composition in accordance with claim 1 wherein said stabilizer is vinyl pyrrolidone and constitutes about 2 percent by weight of said composition.

4. A storage stable lower alkyl ketone peroxide composition in accordance with claim 1 wherein said stabilizer is polyvinyl pyrrolidone and constitutes about 2 percent by weight of said composition.

5. A storage stable lower alkyl ketone peroxide composition in accordance with claim 1 wherein a said ketone peroxide is a coreaction product of methyl ethyl ketone, 2,4-pentanedione, and hydrogen peroxide.

* * * * *